United States Patent [19]
Johansen

[11] Patent Number: 4,468,980
[45] Date of Patent: Sep. 4, 1984

[54] TWIN CLUTCH PACK FOR POWER SHIFT TRANSMISSION

[75] Inventor: Roy W. Johansen, West Allis, Wis.

[73] Assignee: Allis-Chalmers Corp., Milwaukee, Wis.

[21] Appl. No.: 325,499

[22] Filed: Nov. 27, 1981

[51] Int. Cl.³ .................... F16H 37/06; F16H 57/00
[52] U.S. Cl. ...................................... 74/705; 74/411
[58] Field of Search ............... 74/705, 730, 674, 882, 74/410, 411, 331

[56] References Cited

U.S. PATENT DOCUMENTS

| | | | |
|---|---|---|---|
| 1,459,964 | 6/1923 | Alguist | 74/410 |
| 2,427,505 | 9/1947 | Newcomb | 74/411 |
| 2,700,311 | 1/1955 | Bade | 74/411 |
| 2,953,941 | 9/1960 | Schwartz et al. | 74/665 |
| 2,995,046 | 8/1961 | Mansachs | 74/411 |
| 3,298,240 | 1/1967 | McDowell et al. | 74/411 |
| 4,083,266 | 4/1978 | Kreitzberg | 74/337.5 |

FOREIGN PATENT DOCUMENTS

| | | | |
|---|---|---|---|
| 241150 | 10/1962 | Australia | 74/793 |
| 31788 | 5/1923 | Denmark | 74/410 |
| 314037 | 8/1919 | Fed. Rep. of Germany | 74/410 |
| 1164188 | 2/1964 | Fed. Rep. of Germany | 74/411 |
| 1814897 | 8/1969 | Fed. Rep. of Germany | 74/410 |
| 2212757 | 9/1973 | Fed. Rep. of Germany | 74/410 |
| 1204571 | 1/1960 | France | 74/410 |
| 2343174 | 9/1977 | France | 74/411 |
| 584423 | 10/1958 | Italy | 74/410 |
| 833227 | 4/1960 | United Kingdom | 74/331 |

Primary Examiner—Allan D. Herrmann
Assistant Examiner—D. Wright
Attorney, Agent, or Firm—Arthur L. Nelson

[57] ABSTRACT

The invention disclosed comprises twin clutch packs for a power shift transmission to provide two power paths through the power shift transmission and means for combining the drives in a single output drive.

10 Claims, 10 Drawing Figures

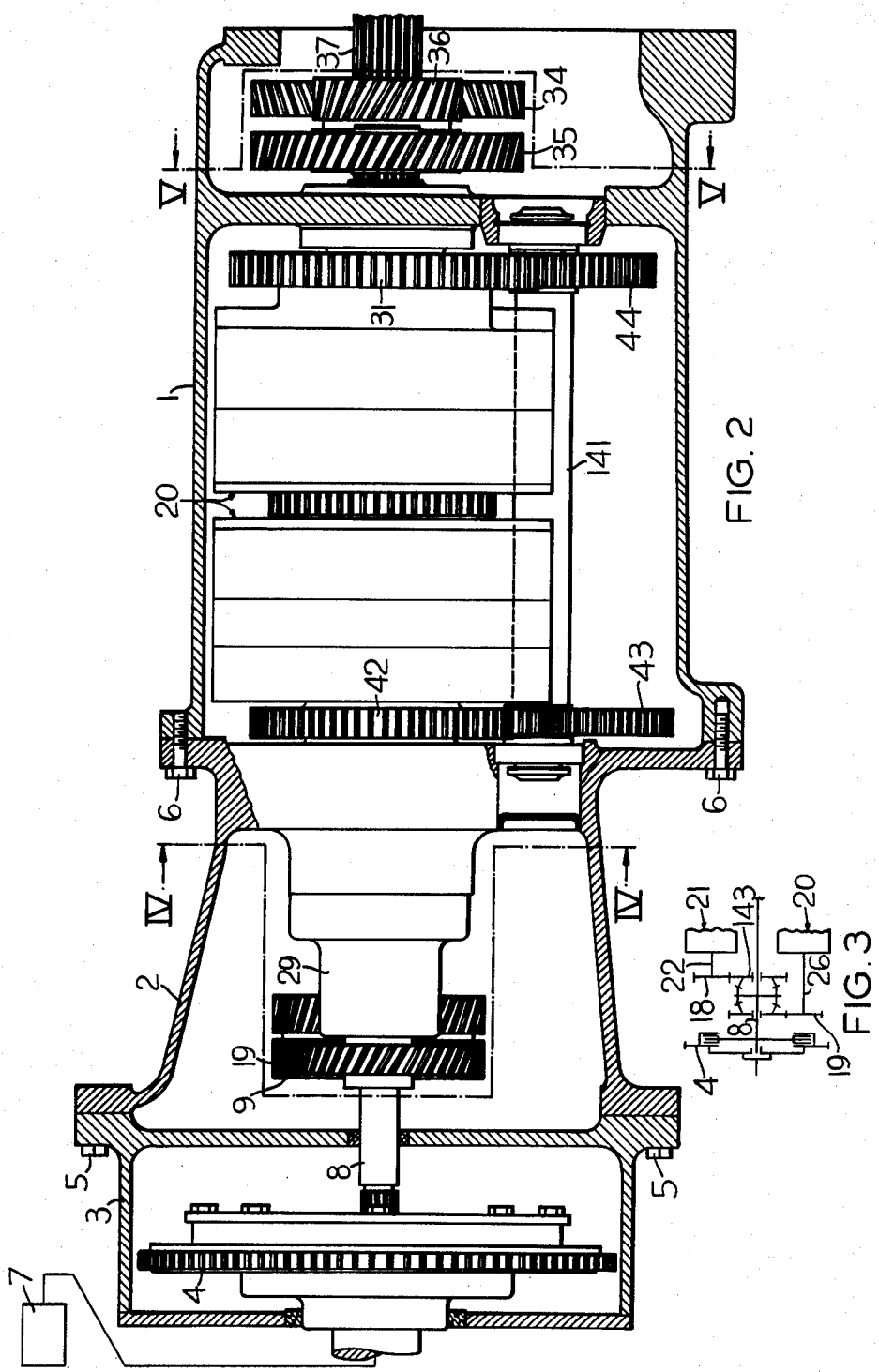

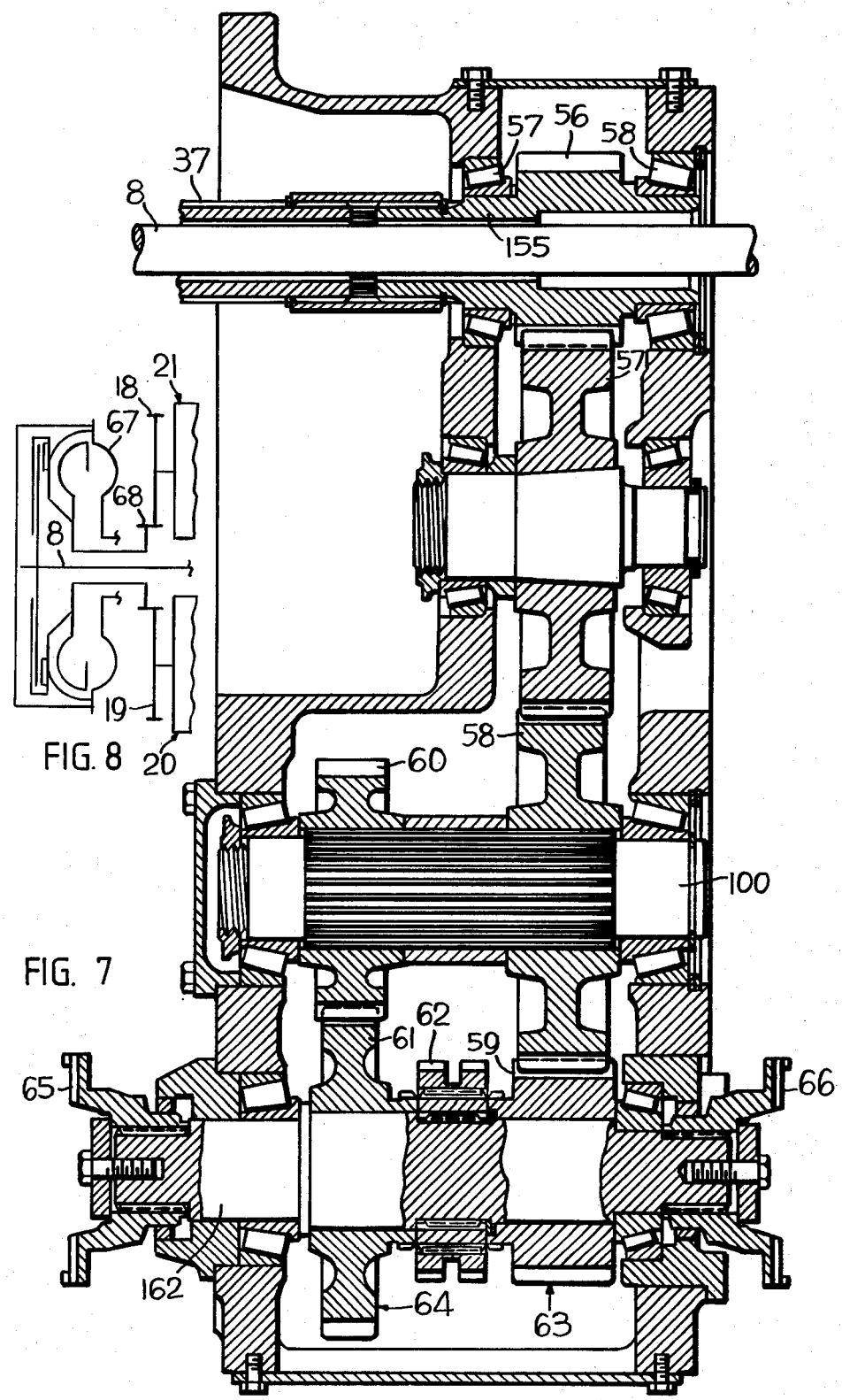

TWIN CLUTCH PACK FOR POWER SHIFT TRANSMISSION

This invention relates to a power shift transmission and more particularly to a transmission having twin clutch packs for dividing the drive in separate power paths through the transmission and recombining in a single output drive. The transmission is a countershaft transmission having a common countershaft for the twin drives through the transmission which recombine as the drive is transmitted to the output shaft.

With an increase in size and power transmitted through a power shift transmission a greater area of clutch plate surface or brake disc surface is required to transmit the increase in torque. Since the clutches are the greatest problem in transmitting increased power a doubling of the power transmitted through the transmission requires a redesign of the whole transmission. The design, development, and manufacturing of a totally new transmission can be rather costly since totally new components are required which also increases the inventory required of dealers. Accordingly this invention uses twin transmissions and uses common components presently in production with parts available in the field.

U.S. Pat. No. 2,953,941 Schwartz et al, shows a single input driving dual output drives for a crawler type tractor. The drive is not recombined in the output but merely drives separate tracks for the crawler tractor. The applicant's invention provides for recombining of the power in the final drive to provide a single output which then is driven through a differential for driving of the vehicle. Accordingly, the drive is from a single input drive which is split to drive twin clutch packs and recombined to drive a single output in the final drive.

Accordingly, it is an object for this invention to provide a transmission with a plurality of power paths through the transmission between a single input drive and a single output drive.

It is another object of this invention to provide single input drive and a single output drive with a plurality of power shift transmissions in parallel driving between the input and output.

It is a further object of this invention to provide an equalizer device on the input drive shaft to drive twin power packs of a power shift transmission and to provide an equalizer for the output of the twin power packs to recombine the power drive to a single output shaft.

The objects of this invention are accomplished by providing a single source of power driving through a single input shaft which is divided between twin power shift transmissions through a torque equalizer device. The torque equalizer device may be one of a number of different modifications as will be described in the application. The purpose of the divider is to assure that the total torque is equally divided between the power paths of the transmission. The power output is recombined to a single output drive shaft through a second torque equalizing device to provide a single output from the transmission. Each of the twin power shift transmissions has a plurality of clutch packs which operate to selectively drive at different speed ratios through a common countershaft and return drive to recombine through the torque equalizer device for a single output drive.

The preferred embodiments of this invention are illustrated in the attached drawings.

FIG. 2 illustrates a cross section side view of the power shift transmission.

FIG. 3 is a modification showing a differential input drive to the power shift transmission.

FIG. 7 is a cross section view of the final drive showing the drop box connected to the output of the transmission.

FIG. 8 is a modification showing a torque converter as an equalizer on the input for the transmission.

Figure 1:
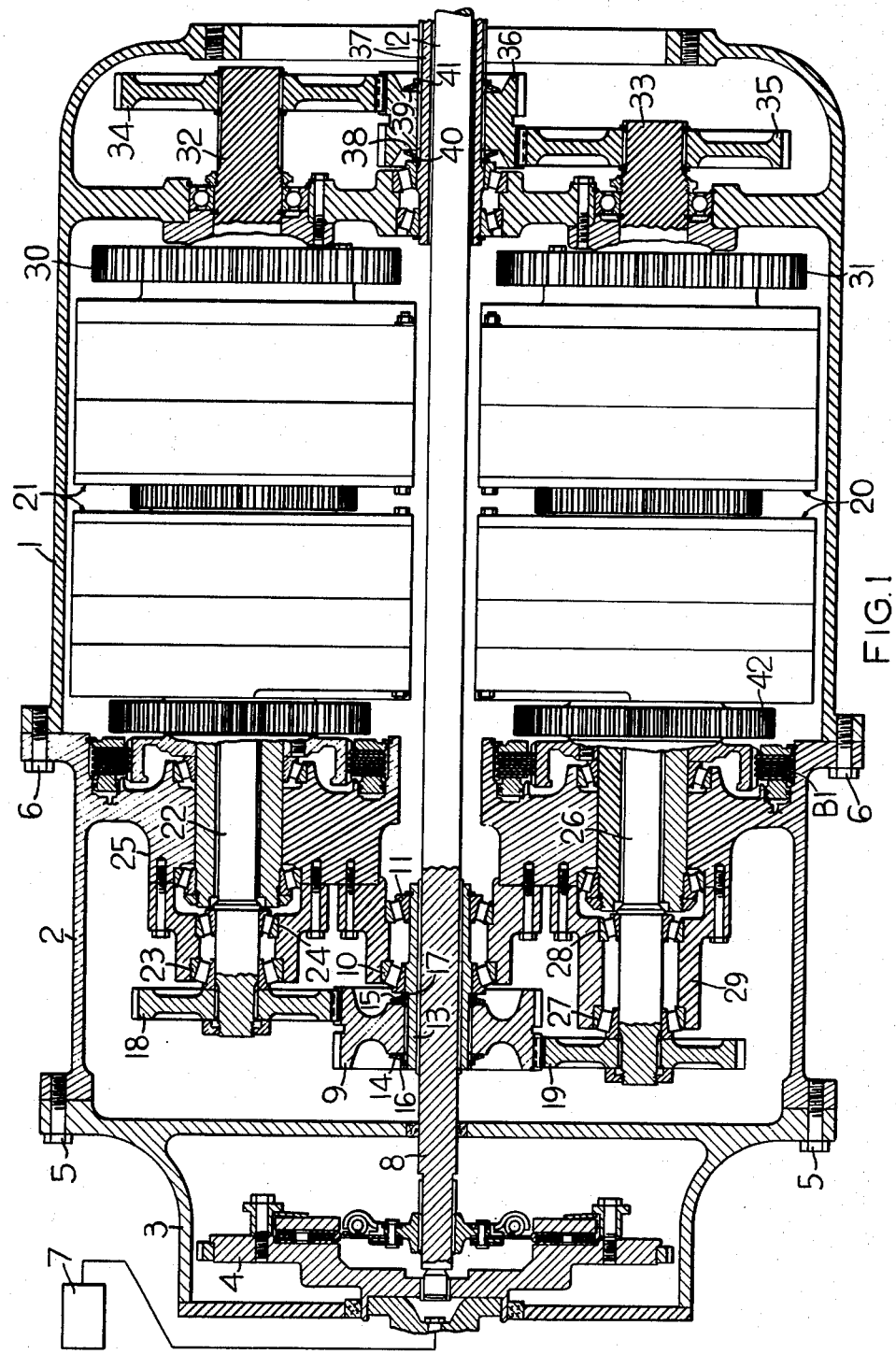
FIG. 1 illustrates a cross sectioned plan view of the power shift transmission.

Referring to FIG. 1 a housing 1 encloses the power shift portion of the transmission. The housing 2 encloses the input drive with the torque equalizer. Clutch housing 3 encloses the input from the engine clutch 4. Housings 2 and 3 are fastened by the plurality of bolts 5 while housings 1 and 2 are fastened by the plurality of bolts 6.

Figure 6:
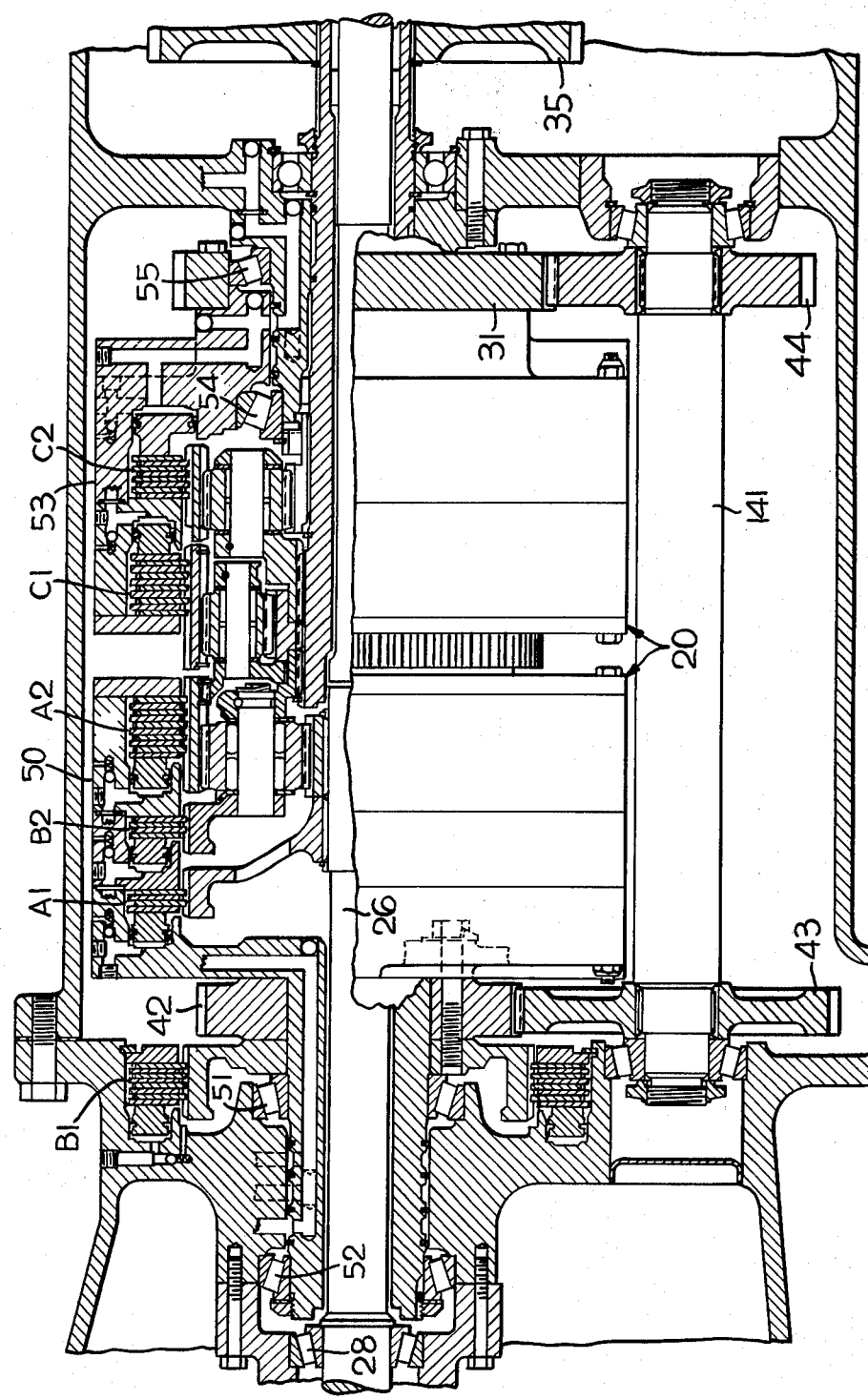
FIG. 6 is a cross section view of the power shift transmission through the clutch assemblies and the countershaft.

The engine 7 drives through the torque limiter and damper 4 and input shaft 8 drives a herringbone gear 9. The input shaft 8 is rotatably mounted in the bearing assemblies 10 and 11 and extends concentrically through the transmission to form the power take off shaft at 12. The input drive shaft 8 is connected through spline to the quill shaft 13 which in turn is connected through a spline to the double herringbone gear 9. The double herringbone gear 9 is permitted to move axially slightly because of the double belleville washers 14 and 15 on the front and rear of the gear hub. The belleville washers 14 and 15 seat adjacent snap rings 16 and 17 of the quill shaft 13. The driven gears 18 and 19 are herringbone gears and are driven by the double herringbone gear 9 to provide an equalizing of the load to the right hand and left hand power shift clutch assemblies 20 and 21. The right and left hand power shift clutch assemblies 20 and 21 are the same as shown in FIG. 6 which will be subsequently described. The drive shaft 22 is rotatably mounted on the bearing assemblies 23 and 24 of the bearing support 25. The drive shaft 26 is rotatably supported in the bearing assemblies 27 and 28 of the bearing support 29. Each of these drive shafts extend into their respective power shift clutch pack.

The output from the power shift clutch packs is transmitted through the gears 30 and 31 which drives the shafts 32 and 33. Shafts 32 and 33 carry the gears 34 and 35 which drive the output herringbone double gear 36. This in turn drives the output shaft 37. The output double herringbone gear 36 is mounted for limited axial movement by the belleville washers 38 and 39 which are seated between the snap rings 40 and 41. FIG. 2 shows a side cross section view the side of the transmission showing the left hand powershift clutch pack assembly 20 driving the countershaft 141 through the gears 42 and 43. Gears 44 and 31 drive from the countershaft back through the power shift clutch pack assembly.

FIG. 3 shows the modification of a torque equalizing device in which the torque limiter and damper 4 drives into a differential which in turn drives the right hand power shift clutch pack assembly 21 and the left hand power shift clutch pack assembly 20. The differential 143 provides equal distribution of torque to both of the power shift clutch pack assemblies.

Figure 4:
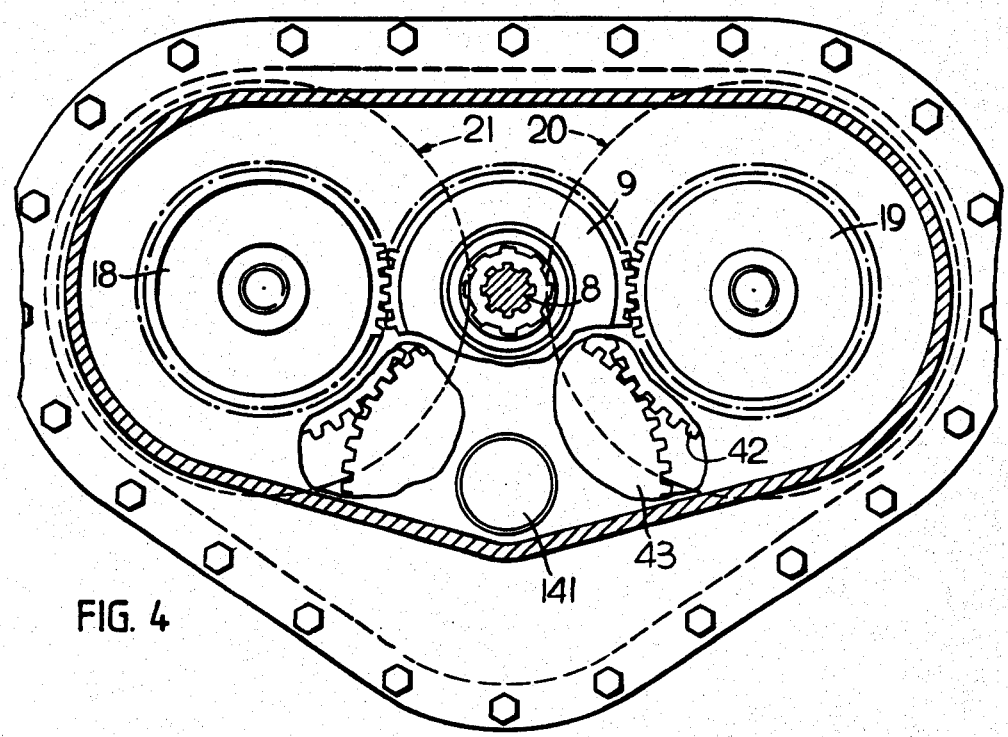
FIG. 4 is a cross section view taken from along IV—IV of FIG. 2.

FIG. 4 shows a cross section view showing the counter shaft 141 immediately below the input shaft 8 operating as a countershaft between the right hand power shift clutch assembly 21 and the left hand power shift clutch assembly 20.

Figure 5:
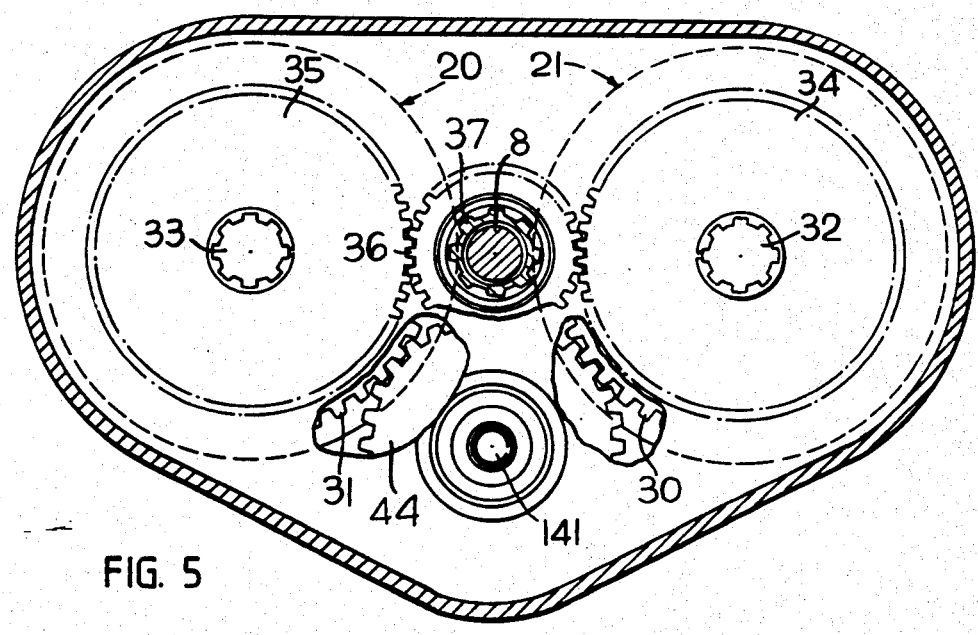
FIG. 5 is a cross section view of the transmission taken on line V—V of FIG. 2.

FIG. 5 shows the rear cross section view of the transmission showing that gears 30, 31 and countershaft gear 44 driving through the output shaft of the transmission.

FIG. 6 shows the left hand power shift clutch pack assembly 20. Clutch pack assemblies includes the clutch B1, A1, B2, A2, C1 and C2. The clutch housing 50 is rotatably mounted on the bearing assemblies 51 and 52 and connected to the gear 42 which drives the countershaft gear 43. Clutches A1, B2 and A2 are carried in the clutch carrier 50 then selectively actuated hydraulically for providing desired gear ratios. The clutch carrier 53 is rotatably mounted in the bearings 54 and 55 and are connected to the gear 31 which is driven by the countershaft gear 44. Reference may be had to the U.S. Pat. No. 4,083,266 for the operation of a power shift transmission with a countershaft as illustrated in FIG. 6. The power shift clutch pack assemblies as illustrated in this application are essentially the same as described in the patent but operate with a common countershaft 141 as shown.

FIG. 7 illustrates the final drive from the output shaft 37 which is coupled to the shaft 155 which is integral with the pinion gear 56 rotatably mounted in the bearing assemblies 57 and 58. Gear 56 drives the idler gear 57 which in turn drives the gear 58 and 59, and the gears 60 and 61 through shaft 100. Clutch collar 62 can be selectively positioned for driving through the gearsets 63 or 64. The shaft 162 provides front and rear wheel drive through the respective yokes 65 and 66 at the desired speed ratio.

FIG. 8 illustrates a modification including torque converter 67 driving right hand power shift clutch pack assembly 21 and the left hand clutch pack assembly 20 through a center drive gear 68. This modification has some advantage over the previous torque equalizing drive mechanisms because the torque converter 67 can be used for inching. Since the clutches C1 and A2 are the low speed clutches which require additional clutch facings the number of clutch discs can be reduced because they will not be necessary for the inching of the transmission. The torque converter can be provided with a lockup means once the transmissions are driving and torque is being equalized to both sides of the power shift transmission.

This design, though the most costly of the three alternatives, would have several advantages since inching would be accomplished by the torque converter rather than by inching clutches. This would reduce the number of plates in the present inching clutches. Upon engagement, any overload in one of the twin clutches would result in a momentary slippage until the other twin clutch picked up its share of the load. The torque converter design must be such that torque multiplication does not exceed the transmission torque capacity prior to lock-up.

Figure 10:
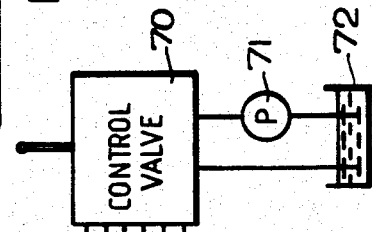
FIG. 10 illustrates a chart showing the speeds and the clutches actuated for the respective speed ratios.
Figure 9:
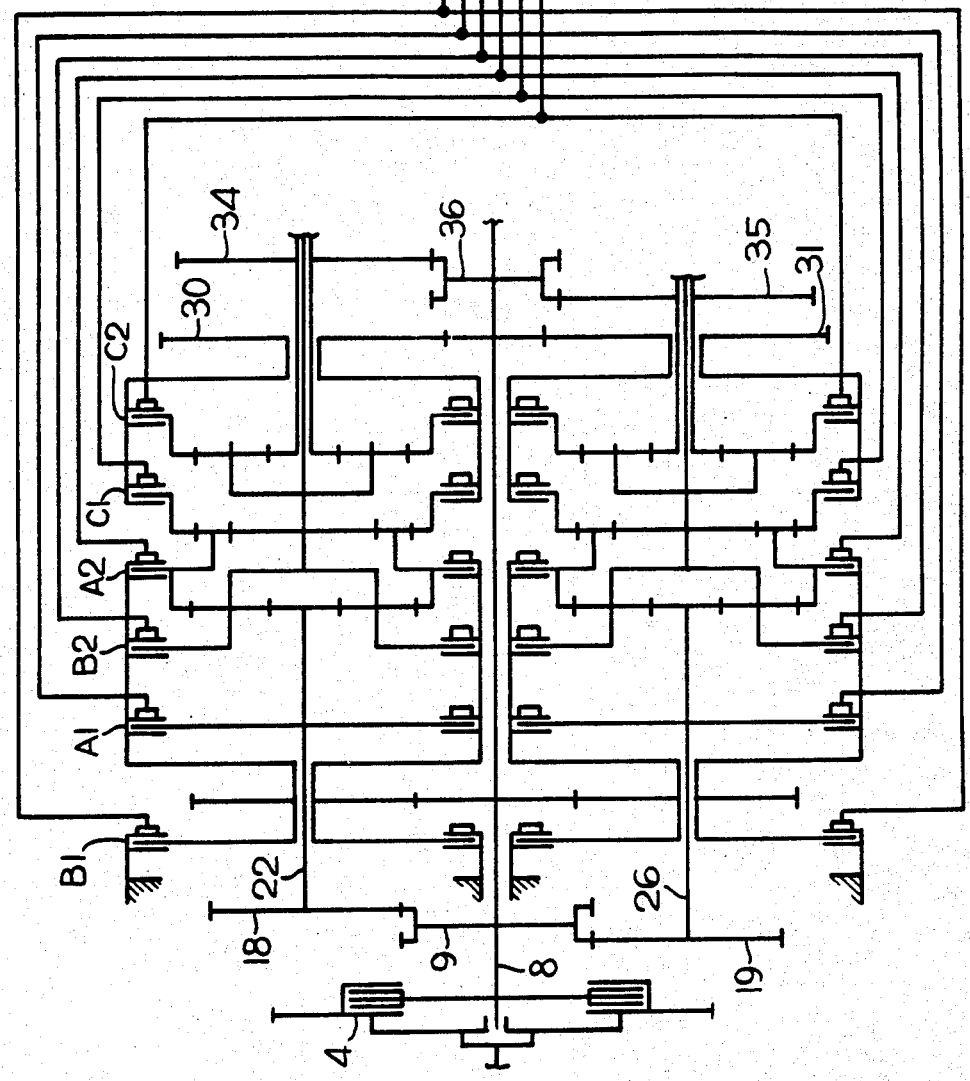
FIG. 9 is a schematic view of the hydraulic control system for the power shift transmission.

FIGS. 9 and 10 illustrate the hydraulic systems for actuating the twin power shift clutch pack assemblies which are both operated through a single control valve 70 receiving pressurized fluid from the pump 71. The pump receives fluid from the reservoir 72 and supplies pressurized fluid through the valve 70 to selectively operate hydraulic actuators in the clutches B1, A1, B2, A2, C1 and C2. Actuation of the clutches for the desired gear ratio is indicated in FIG. 10. Only two clutches are necessary to actuate the transmission in any one gear ratio.

The operation of the transmission will be described in the following paragraph.

The twin pack power shift transmission transmits power from the engine 7 to drive the vehicle. Power is transmitted through the torque limiter and damper 4 and into the equalizer double herringbone gear 9 which drives the driven herringbone gears 18 and 19. The double herringbone gear 9 has limited axle movement to equalize torque and avoid excessive torque transmitted through either one of the power shift clutch pack assemblies. Normally a limited amount of axial movement will relieve the excess load and will allow normal transmission equally through both sides of the power shift clutch pack assemblies. Similarly the output from the clutch pack assemblies will drive through the double herringbone gear 36 which in turn drives the herringbone gears 34 and 35. Since the double herringbone gear 36 is mounted for limited axle movement it too will equalize the torque which is transmitted through the gear to the output of the transmission. Accordingly the drive from the torque limiter and damper 4 will be equally divided and then transmitted through the right and the left hand power shift clutch pack assemblies of the transmission.

FIG. 3 illustrates a differential on the front end of the transmission in place of the herringbone gears. The differential would not allow either one of the power shift clutch assemblies to overload the other regardless of the torque transmitted through the transmission. A similar differential would be used on the output of the transmission to equalize the speed and torque from the output of the right and the left hand power shift clutch pack assemblies. The use of a differential in place of the herringbone gears allows more relative movement between the driving gears of the power shift clutch pack assemblies and is less likely to overload any one section of the powershift clutch pack assemblies.

FIG. 8 illustrates a torque converter 67 positioned in front of the transmission to insure that there is equal torque transmitted to both sides of the power shift clutch pack assembly. This modification has the added advantage of providing inching of the transmission when operating at low speeds to provide limited slippage of the transmission.

The embodiments of the invention in which an exclusive property or privilege is claimed are defined as follows:

1. A power shift transmission for a vehicle comprising, a single input drive shaft, twin power shift clutch pack assemblies, a torque equalizer connected between said input drive shaft and said twin power shift clutch pack assemblies transmitting power from said single input drive shaft equally to said twin power shift clutch pack assemblies including, a driving gear, twin driven gears, load shiftable means for equalizing the drive forces to said twin driven gears, a common countershaft operating with each of said twin power shift clutch pack assemblies, a single output drive shaft, an output torque equalizer driven by said twin power shift clutch pack assemblies equalizing torque from said power shift clutch pack assemblies, including twin driving gears, an output driven gear, a load shiftable means for equalizing the drive forces from said twin driving gears thereby driving said output shaft of said transmission.

2. A power shift transmission for a vehicle as set forth in claim 1 including a torque limiter and damper transmitting torque to said single input drive shaft.

3. A power shift transmission for a vehicle as set forth in claim 1 wherein said equalizers include differential drives between said input drive shaft and said power shift clutch pack assemblies and between said power shift clutch pack assemblies and said output drive shaft for equalizing torque of said power shift clutch pack clutch assemblies.

4. A power shift transmission for a vehicle as set forth in claim 1 wherein said equalizer include a torque converter for driving from said single input drive shaft for equalizing torque from said single input drive shaft to said twin power shift clutch pack assemblies.

5. A power shift transmission for vehicle as set forth in claim 1 wherein said equalizers comprise floating herringbone gear means allowing limited restrained axial movement to equalize torque between said power shift clutch pack assemblies from said input drive shaft.

6. A power shift transmission for a vehicle as set forth in claim 1 including a power take off shaft driven by said input drive shaft.

7. A power shift transmission for a vehicle as set forth in claim 1 wherein said single input drive shaft is mounted centrally relative to said power shift clutch pack assemblies.

8. A power shift transmission for a vehicle as set forth in claim 1 wherein said input drive shaft and said output drive shaft defines axes of rotation lying in a horizontal plane including the coaxial centers of said power shift clutch pack assemblies.

9. A power shift transmission for a vehicle as set forth in claim 1 wherein said input shaft and said output shaft define axes of rotation, said countershaft defines an axis of rotation in a vertical plane including said axes of said input and output shafts, said power shift clutch pack assemblies define axes of rotation in a horizontal plane including the axes of rotation of said input and output shafts.

10. A power shift transmission for a vehicle as set forth in claim 1 including a power take off shaft defining an axis coaxial with by said input shaft and output shafts, said power shift clutch pack assemblies defining axis of rotation lying in a horizontal plane coincidental with the input and output shaft axes, said countershaft defining an axis of rotation lying in a vertical plane including the axis of said input and output shafts.

* * * * *